United States Patent [19]

Negas et al.

[11] Patent Number: 5,262,370
[45] Date of Patent: Nov. 16, 1993

[54] DIELECTRIC CERAMIC COMPOSITIONS

[75] Inventors: Taki Negas, Frederick; Glenn J. Yeager, Walkersville, both of Md.

[73] Assignee: Trans-Tech, Inc., Adamstown, Md.

[21] Appl. No.: 864,730

[22] Filed: Apr. 7, 1992

[51] Int. Cl.$^5$ .............................................. C04B 33/46
[52] U.S. Cl. ............................................... 501/138
[58] Field of Search ........................................ 501/138

[56] References Cited

U.S. PATENT DOCUMENTS

| Re. 29,484 | 11/1977 | Utsumi et al. | 501/138 |
| 3,938,064 | 2/1976 | O'Bryan, Jr. | 333/73 |
| 4,330,631 | 5/1982 | Kawashima et al. | 501/139 |

FOREIGN PATENT DOCUMENTS

| 0532780 | 11/1956 | Canada | 501/138 |
| 0004358 | 2/1977 | Japan | 501/138 |
| 0069607 | 4/1982 | Japan | 501/138 |
| 0020907 | 2/1984 | Japan | 501/138 |
| 0094302 | 5/1984 | Japan | 501/138 |

*Primary Examiner*—Mark L. Bell
*Assistant Examiner*—Deborah Jones
*Attorney, Agent, or Firm*—Nikaido, Marmelstein, Murray & Oram

[57] ABSTRACT

Ceramic composition comprising oxides of the elements Ba, Ti, Zn, and Me where Me is Nb or Nb and Ta, the mole ratios of the elements relative to Ba being:

$$3.8 \leq Ti \leq 4.5$$

$$0.1 \leq Zn \leq 1.0$$

$$0.05 \leq Me \leq 0.3$$

and the composition containing at least one crystal structure of $BaTi_4O_9$ and $BaTi_9O_{20}$. The ceramic compositions have an excellent combination of electrical characteristics including Q value at the frequencies of interest for dielectric resonators, the dielectric constant and the $T_f$ value and are well adapted for use as electrical components in equipment operating at microwave frequencies such cellular communications equipment.

16 Claims, No Drawings

DIELECTRIC CERAMIC COMPOSITIONS

The present invention relates generally to ceramic compositions having excellent electrical properties and, more particularly, to ceramic compositions especially adapted for use as electrical components for microwave applications such as in receivers for broadcasting systems such as satellite broadcasting, in communications equipment such as in dielectric resonators for cellular telephone equipment, and in detection devices such as frequency sensors.

While the ceramic compositions of the subject invention will be discussed primarily hereinafter with reference to their use in providing dielectric resonator filters for microwave communications equipment such as cellular telephone equipment, it is to be understood that the uses and applications of the ceramic materials of the subject invention are not thereby so limited. For example, the ceramic materials of the invention may be useful in many other types of electrical devices such as in microwave stripline circuits, oscillators, phase shifters, ceramic type capacitors and the like as well as in other non-electrical applications where ceramic type materials are used such as, for example, in applications requiring high resistance to heat and the like.

In communications equipment such as microwave cellular telephone receiving and transmitting stations, conventional circuits employ various cavity type resonators and waveguides as filters and transmission lines. In one particular application in microwave communication equipment, it is presently common practice to utilize a number of dielectric ceramic resonators to filter microwave signals for the desired transmit and receive frequency or frequencies. Typically, these dielectric resonators comprise a circular-shaped block commonly termed a puck composed entirely of a particular ceramic composite material having specific electrical characteristics particularly adapted for this application. Often, a plug or cylinder of the same material is used in combination with the puck to help tune the frequency of interest.

One of the generally accepted measures of the ceramic composition comprising the material of the dielectric resonator to accurately and precisely filter to the desired frequency to the exclusion of other frequencies is the Q value which is inversely proportional to the dielectric loss for the composition. Thus Q value may be defined as equal to $1/\tan \delta$ and can be related to the bandwidth of the frequency spike filtered by the resonator. For those dielectric resonators used in microwave applications, an unloaded Q value of at least 25,000 at about 1GHz is the generally accepted minimum design value for acceptable performance and of course higher values of Q are even more desirable.

In addition to the above-mentioned Q value, the ceramic composition used in such dielectric resonators should have a low variation in the filtering frequency as the temperature of the ceramic composition varies in the range of normal ambient temperatures, generally between $-30°$ to $70°$ C. As is well recognized, the frequency characteristics of ceramic materials are particularly sensitive to slight variation in the dielectric constant, particularly at the frequencies in the microwave region. In other words, the ceramic composition should filter all but the assigned frequency over the largest temperature range as possible and the frequency allowed to pass through the resonator should vary as little as possible over this same temperature range. The generally accepted measure for this characteristic of the temperature variation of the ceramic material is generally measured by a temperature coefficient which represents the change in the frequency in parts per million per degree centigrade and is commonly known as $T_f$. Acceptable values for $T_f$ are normally about $-6$ ppm/.C. to about $+6$ ppm/° C. for most commercially acceptable ceramic compositions. Specific $T_f$ values or requirements in the above range depend on circuit design and device construction materials, e.g. metals.

The third generally accepted quality measure for a ceramic composition in terms of its suitability for the above applications is the dielectric constant ($E'$) of the composition. Generally, the composition should have a dielectric constant which is as high as possible, generally a value of at least 30, preferably about 35 or more. Without a relatively high dielectric constant, the device incorporating the ceramic composition becomes unacceptably large in size and thus equipment incorporating such devices tend to become expensive, bulky, and unacceptable in the commercial marketplace. For example, with dielectric ceramic resonators, any increase in the dielectric constant for the ceramic material enables the height as well as the diameter of the device to be reduced thereby making it possible to further miniaturize the device and realize savings in space and material costs.

As with most properties of materials, there is generally a compromise among the various properties which are achieved by a particular composition relative to other compositions. Thus, for example, a composition may have an exceptionally high Q value but a mediocre or even unacceptable $T_f$ and $E'$ values. Modification of the composition in some fashion may, for example, increase the o dielectric constant $E'$ but at the expense of the Q value. Consequently, almost any modification of acceptable compositions tends to become a trade-off between the various properties of interest for that particular application.

Generally speaking, there are many known ceramic compositions which have an acceptable dielectric constant and sufficiently high Q value for applications such as microwave applications but most, if not all, have a relatively large temperature variation of the dielectric constant. Thus the temperature stability is low and the compositions tend to have relatively large changes in frequency with temperature variation. To operate satisfactorily, such compositions may require external temperature stabilization which further increases costs.

Commercial dielectric ceramic compositions of particular interest for the above microwave applications generally fall within three general classes, ceramics of the compositions (a) $(Zr,Sn)(Ti,Sn)O_4$, (b) barium titanates such as $Ba_2Ti_9O_{20}$ and BaLnTi-oxides where Ln is Nd or Sm, and (c) $Ba_3Ta_2MeO_9$ where Me is Zn or Mg. For example, dielectric ceramic materials of the BaLn-Ti-oxides where Ln is Sm are disclosed in U.S. Pat. No. 4,330,631 to Kawashima et al. In addition, dielectric ceramic materials comprising $Ba_2Ti_9O_{20}$ are disclosed in U.S. Pat. No. 3,938,064 to O'Bryan et al and a $Ba_3Ta_2ZnO_9$ type material is disclosed in Japanese Patent Application No. 53-35454. While these compositions are acceptable for many purposes including dielectric resonators for microwave communications systems, the overall combination of required electrical and physical properties as set forth above is not at an optimum and therefore those of skill in this art are constantly searching for materials or compositions having even a better overall combination of properties for these particular applications.

Recently, a dielectric resonator material containing reacted oxides of Ba, Ta, Zn and Ti has been made commercially available by NGK Insulators, Ltd. of Japan. While the precise composition of this material is not presently known, it is believed that the material contains about 3-4 mol percent $Ta_2O_5$, about 36 mol percent ZnO and the balance $BaO/TiO_2$ expressed as about 60 mol percent $BaTi_4O_9$ which, after reaction, is a crystalline mixture of $BaTi_4O_9$ and $BaTi_9O_{20}$. This material appears to exhibit a high Q value, generally about 30,000, and quite acceptable values for $T_f$ and for the dielectric constant $E'$. One real disadvantage for this ceramic material is the relatively high material costs associated with making the material, particularly for the tantalum component which is currently in the vicinity of about $80-100 per pound for tantalum oxide. While the proportion of tantalum in the material is rather small, the relatively high cost for the tantalum contributes significantly to the overall cost of a dielectric resonator incorporating this raw material.

SUMMARY OF THE INVENTION

It is therefore a feature of the subject invention to provide a ceramic composition that exhibits a good combination of high Q or loss value, a stable temperature coefficient of frequency $T_f$ and a high dielectric constant.

It is another feature of the subject invention to provide a ceramic composition that exhibits high Q or loss value, generally at least 25,000 or more, at a frequency of about 900 MHz.

It is a further feature of the subject invention to provide a ceramic composition that exhibits a stable temperature coefficient of frequency $T_f$, generally between about −6 and 6 and preferably around zero.

It is another feature of the subject invention to provide a ceramic composition that exhibits a high dielectric constant, generally a dielectric constant of at least 30 or more, most often, a dielectric constant 35 or more.

It is also a feature of the subject invention to provide a ceramic composition which has relatively low material costs and which can be manufactured relatively inexpensively.

It is yet another feature of the present invention to provide a ceramic composition which is particularly adapted for use in dielectric resonators for microwave communication equipment.

It is a further feature of the subject invention to provide a resonator for microwave applications which has, among other things, excellent electrical and physical properties.

Briefly, the present invention comprehends, in its broader aspects, a ceramic composition comprising oxides of the elements Ba, Ti, Zn and Nb, preferably a composition comprising from about 90 to 50 mole percent oxides of barium and titanium, about 1 to 50 mole percent oxides of zinc and about 0.1 to 10 mole percent oxides of niobium based on the total moles of Ba, Ti, Zn and Nb, the mole ratio of titanium to barium being from 3.8 to 4.5.

The subject invention further comprehends a ceramic composition comprising oxides of the elements Ba, Ti, Zn, and Nb, the mole ratios of the elements relative to Ba being:

$3.8 \leq Ti \leq 4.5$ $0.1 \leq Zn \leq 1.0$ $0.05 \leq Nb \leq 0.3$ and the composition contains at least one crystal structure of $BaTi_4O_9$ and $BaTi_9O_{20}$. Preferably, the mole ratio of Ti to Ba is from 4 to 4.3 and the mole ratio of Zn is 0.4 to 0.8.

Further features, objects and advantages of the present invention will become more fully apparent from a detailed consideration of the following description of the preferred embodiments of the invention.

DETAILED DESCRIPTION OF THE INVENTION

As was previously mentioned, the subject invention is directed to ceramic materials which contain, on a compositional basis, oxides of barium, titanium, zinc and niobium. These materials include compositions which may be defined according to the general formula $BaTi_{(4+n)}O_{(9+2n)}$ where n ranges from −0.2 to 0.5, such as, for example, $BaTi_4O_9$ and/or $Ba_2Ti_9O_{20}$, and oxides of zinc such as ZnO and oxides of niobium such as $Nb_2O_5$. The presently preferred range for n in the above formula is 0 to 0.5, particularly 0 to about 0.3. Preferably these oxides of barium and titanium as set forth above included in the compositions comprise a major proportion, for example, at least about 50%, more preferably at least about 60 percent by mole, up to about 90 mole percent or more of the composition, those compositions containing about 60 to 70 mole percent being particularly preferred.

The zinc generally forms a minor but significant component of the compositions such as, for example, from about 5 mole percent up to about 50 mole percent, preferably about 15 to 40 mole percent. Niobium generally may be included in very minor proportions such as, for example, about 0.1 to about 10 mole percent but generally at least about 1.0 mole percent up to about 10 mole percent. Preferred inclusions of niobium are from about 2 to about 5 mole percent, particularly preferred inclusions being from about 3 to about 5 mole or even about 3 to about 4 mole percent. In accordance with the concepts of the present invention, some (up to about one half or more) but not all of the niobium in the niobium-containing component further may be replaced by a tantalum containing component.

The subject compositions have microstructures and, especially, microchemistries which are not entirely understood at present. However, the microstructure appears to consist of a composite of multiple crystalline phases and generally has an uniform grain size of about 3 to 5 microns containing the crystalline phases of $BaTi_4O_9$, and/or $Ba_2Ti_9O_{20}$ alone or their solid solutions which contain very small amounts of the oxides of zinc, tantalum and niobium. Generally, no abnormal crystalline grain growth of these phases, which is oftentimes typical of ceramic compositions containing a significant amount of $BaTi_4O_9$, has been observed.

The compositions of the present invention also appear to contain another crystalline phase containing the oxides of barium, titanium and zinc as indicated by optical and electron microscopy as well as x-ray diffraction. This phase typically has a grain size of about 5 to 10 microns. While not wishing to be bound by the following, this latter crystalline phase appears to have the formulation close to $Ba_3Ti_{12}Zn_7O_{34}$ as this formulation tends to somewhat correspond with the X-ray evidence of the phase. In addition, solid solubility of the ZnO component alone in the $BaTi_4O_9$ and $Ba_2Ti_9O_{20}$ phases has not been observed but there appears to be a slight solubility of $Nb_2O_5$ plus ZnO, thought to be less than about 4 mole percent, in these two phases.

As was mentioned previously, n in formula $BaTi_{(4+n)}O_{(9+2n)}$ can vary from $-0.2$ to 0.5. When n is less than zero, it is important that the ceramic materials of the invention include sufficient amounts of Zn and Nb such that the final composition includes three phases such as, for example, $BaTi_4O_9$, $Ba_3Ti_{12}Zn_7O_{34}$ and $Ba_3Ti_4Nb_4O_{21}$, or $Ba_2Ti_9O_{20}$, $Ba_3Ti_{12}Zn_7O_{34}$ and $Ba_3Ti_4Nb_4O_{21}$, in order to achieve the desired characteristics for the ceramic material.

Methods or processes for preparing the ceramic compositions according to the present invention may vary considerably depending upon, among other things, the particular composition of the ceramic material, the desired properties of the material depending upon its intended use, the manners in which the material is treated, and the like. The subject ceramic compositions can generally be obtained by typically practiced processes as are well known in the art to which the present invention pertains. Such conventional processes may be conducted without any special or additional processing procedures.

Thus, for example, source materials comprising oxides of the desired metals having valencies the same or different from the valencies in the resulting ceramic composition may be suitable. These source materials may be mixed in the desired proportions and then fired at an elevated temperature in a suitable atmosphere so as to convert the source materials to the appropriate compounds or compositions and to densify the composition. Oxides of the metals in the source materials may be replaced in whole or in part with carbonates, hydroxides and the like. Generally speaking, any source material which upon firing yields the desired oxide can be utilized.

More specifically, compositions of the invention may be prepared by initially mixing or otherwise combining oxides and/or carbonates of Ba, Ti, Zn and Nb in the appropriate proportions. Suitable oxides and carbonates of the above elements include $BaTiO_3$, ZnO, $Nb_2O_5$, $BaCO_3$, $Ba(OH)_2$, $BaTi_4O_9$, $Ba_2Ti_9O_{20}$, $ZnNb_2O_6$ and the like which when combined in the appropriate proportions will result in the desired composition for the ceramic. Presently preferred source materials include materials such as $BaTiO_3$, $TiO_2$, ZnO and $Nb_2O_5$.

When mixing is used to combine the starting ingredients or source materials, mixing can be accomplished by wet blending in a suitable liquid vehicle such as water optionally in the presence of mixing or blending media such as alumina or zirconia spheres. After a thorough mixing, the source materials are dried at room or an elevated temperature to drive off the vehicle and then calcined in a suitable atmosphere such as an oxidizing atmosphere like air, enriched air or oxygen so as to convert, for example, carbonates to oxides and/or to change the valencies of the oxides from that of the source material. Suitable temperatures for calcining are generally in the range of up to about 1000° C. to about 1300° C. or more, preferably about 1050° C. to about 1125° C. The time period used for calcining depends upon, among other things, the time necessary to ensure that the desired reactions have been achieved from the source materials and is generally in the range of about 1 to about 6 hours.

The loose ceramic powder obtained after calcining then may be milled or otherwise comminuted to the desired particle size for final compaction. Generally, the powder is reduced to a fine particle size, typically an average particle size of less than about 10μm, preferably to an average particle size of about 1 to 2μm, such as by grinding while the powder is wetted by a liquid vehicle such as distilled water and using a grinding media such as alumina or zirconia spheres. After the milled calcined powder is dried such as by air drying or spray drying, the powder mixture is compacted by any suitable process including isostatic pressing, uniaxial pressing, molding, extrusion and the like into the desired final shape.

The shaped compact is then fired at a temperature of at least as high and preferably greater, than the calcining temperature. Generally the firing temperature is in the range of about 1100° C. to 1350° C. or more, preferably about 1225° to 1300° C. Again the firing is preferably conducted in an oxidizing atmosphere such as air or oxygen and for a period of time necessary to achieve the desired final characteristics for the compact, generally a time period of about 1 hour to about 6 hours or more. Preferably, the resultant fired compacts of the ceramic composition have a density of at least about 98 percent of theoretical density to achieve optimum properties.

It has been found that an important consideration in conducting the procedure of firing the compacted ceramic composition to yield the final ceramic product may be the inclusion of a small amount of firing but not a sintering aid in the compact prior to firing. Inclusion of such an aid tends to prevent the various oxides in the densified, reacted, ceramic from losing oxygen (reducing) and thus converting to other oxide forms during firing and in the subsequent cool-down phase. It is believed that the firing aid may absorb free electrons and thus help prevent the loss of oxygen from the compact. The composition of the aid may vary considerably but it has been found that the inclusion of manganese such as in its oxide form, generally in amounts less than about 1 mole percent, preferably 0.01 to 0.1 mol percent, provide excellent results in terms of minimizing oxygen loss from the compact. The aid may be incorporated into the composition at various points in the procedure of preparing the ceramic compositions, it being presently preferred to add the aid such as manganese oxide as an aqueous solution or suspension prior to drying of the comminuted powder. Inclusion of quite small amounts of the firing aid are presently preferred as significantly greater amounts may modify the structure of the final composition, particularly the microchemistry of the ceramic, which may adversely affect the final electrical and physical properties of the composite product, particularly the Q factor.

It has also been found that the inclusion of significant amounts of impurities, particularly in the raw material source providing the Ti component, should be avoided. For example, it has been found that high purity titanium oxides, that is, having a purity of at least 99.5 percent, preferably at least about 99.9 modified percent, should be used in order to avoid detrimental effects on, for example, the electrical properties of the final ceramic composition, especially the Q factor. Contaminants such as phosphorus and silicon which are common and may be contained in source materials such as titanium dioxide are to be particularly avoided if at all possible. Such high purity titanium oxides (99.9 percent) in the form of titanium dioxide powders are commercially available from various sources.

As was mentioned previously, the ceramic compositions according to the present invention have an excellent overall combination of electrical and physical properties making the compositions particularly suitable for use in dielectric resonators for microwave communication applications. That is, each of the compositions has an excellent combination of high Q value or low dielectric loss, high dielectric constant and low temperature coefficient of resonance frequency. More specifically, the ceramic compositions generally have a Q value of 30,000 or more when measured at about 900 MHz (cellular telephone frequency), a highly acceptable dielectric constant of at least 30, and a relatively stable resonant frequency temperature coefficient of near zero.

Contrary to generally accepted beliefs in the ceramic arts, particularly the ceramic arts relating to dielectric materials for microwave applications and the like, the inclusion of niobium in the compositions does not appreciably degrade the electrical and physical properties of the compositions as might normally be expected. More specifically, it has been the generally accepted consideration in the art that the substitution of niobium for tantalum in known ceramic compositions produces compositions having a significantly reduced Q values, reductions of such significance that the compositions would be useless in most if not all microwave applications. Quite surprisingly, it has been found that, contrary to the above expectations, the subject compositions have Q values comparable or even greater than similar compositions containing tantalum instead of niobium.

It is also to be specifically noted that the compositions of the present invention are relatively more economical to produce, particularly when compared with ceramic compositions of similar compositions which contain tantalum. As was set forth previously, tantalum in either the elemental or oxide form is very expensive at current market prices whereas niobium has a current market value considerably less than tantalum, generally on the order of about 10 to 20 percent of the cost of tantalum. As a consequence, ceramic compositions containing niobium which have comparable or even better electrical characteristics, particularly for microwave applications, than those of similar composition containing tantalum can be produced at significantly reduced costs.

Specific ceramic compositions according to the invention are presented in the following examples. It should be understood that the examples are given herein for the purposes of illustration and do not limit the invention as has been heretofore described to these particular examples.

EXAMPLE 1

A composition according to the invention was prepared, formed into a sintered compact and then tested for electrical properties to determine its suitability for a dielectric resonator for microwave applications.

Appropriate amounts of $BaTiO_3$, titanium dioxide, zinc oxide and niobium pentoxide in the form of powders were mixed to yield upon further sintering the ceramic composition according to the invention. The amounts of the starting materials in terms of mol percentages are set forth in the following Table. Mixing of the powders was accomplished by wet blending in water. After a thorough mixing, the blended powder slurry was dried at an elevated temperature overnight to drive off the water to yield an essentially dry powder. Calcining of the mixed powders was then conducted in an air atmosphere at a temperature of about 1100° C. for about 4 hours to react the starting oxides.

The loose ceramic powder obtained after calcining was then milled in distilled water, using zirconia spheres, to an average particle size of about 1 to 2um. During milling, an aqueous suspension containing an appropriate amount (0.05–0.1wt.%) of manganese dioxide was added as a firing agent. The milled powder was dried by spray drying and the dried powder compacted by uniaxial pressing under an applied pressure of 100 MPa into a puck-like shape. The compacted and shaped mixture was then fired at a temperature of 1250° C. The firing was conducted in an oxygen enriched air atmosphere for a time period of about 4 hours and then cooled to room temperature. Circular specimens for electrical testing at ~4.5GHz were extracted from the puck. These specimens had dimensions of about 0.5" OD by 0.2" thick.

The completed ceramic composition was subjected to analysis and from X-ray diffraction appeared to contain at least the phases of $BaTi_4O_9$, $Ba_2Ti_9O_{20}$ and $Ba_3Ti_{12}Zn_7O_{34}$, as major phases; these phases being present in amounts of at least 5 percent by volume. Phases less than 5 percent were not determined. The composition was then tested for electrical characteristics of Q value at 4.0–4.5 GHz, $T_f$ value and dielectric constant (E'). Although the Q value for the sample was measured at frequencies which are not in the cellular telephone range, the Q values give an approximate indication of the Q value in (850–900 MHz) even though there is not a strict linear relation for Q between the two ranges of measurement. The results of these electrical tests are shown in the Table.

EXAMPLE 2

The above procedure was essentially repeated to produce another ceramic composition in accordance with the present invention. The test sample of the ceramic composition was a circular puck having a diameter of about 2¼ inches and a thickness of about 1 inch. The sample was formed from the compositions set forth in the Table and the major crystalline phases present as determined by X-ray diffraction were $BaTi_4O_9$, $Ba_2Ti_9O_{20}$ and $Ba_3Ti_{12}Zn_7O_{34}$. In addition to testing for the electrical characteristics as set forth in Example 1, the Q value at 850–900 MHz was also determined since this is the test frequency range most indicative of the applicability of the composition for use a dielectric resonator and the size of the sample prepared enabled such a determination to be easily made.

EXAMPLE 3

The procedure of Example 1 was essentially repeated to produce a different ceramic composition in accordance with the present invention which had a size of sample according to Example 2. The ceramic was formed from the composition listed in the Table and the major crystalline phases present as determined by X-ray diffraction were $BaTi_4O_9$, $Ba_2Ti_9O_{20}$ and $Ba_3Ti_{12}Zn_7O_{34}$. The electrical characteristics of the sample are also shown in the Table.

EXAMPLE 4

The procedure of Example 1 was essentially repeated to produce a different ceramic composition in accordance with the present invention which had a size of sample according to Example 2. The ceramic was formed from the composition listed in the Table and the major crystalline phases present as determined by X-ray diffraction were $BaTi_4O_9$, $Ba_2Ti_9O_{20}$ and $Ba_3Ti_{12}Zn_7O_{34}$. The electrical characteristics of the sample are also shown in the Table. The material had a relatively higher Q value at the tested frequency.

EXAMPLE 5

The procedure of Example 1 was essentially repeated to produce a different ceramic composition in accordance with the present invention. The ceramic was formed from the composition listed in the Table and the major crystalline phases present as determined by X-ray diffraction were $BaTi_4O_9$, $Ba_2Ti_9O_{20}$ and $Ba_3Ti_{12}Zn_7O_{34}$. The electrical characteristics of the sample are also shown in the Table.

EXAMPLE 6

The procedure of Example 1 was essentially repeated to produce a different ceramic composition in accordance with the present invention which had a size of sample according to Example 2. The ceramic was formed from the composition listed in the Table and the major crystalline phases present as determined by X-ray diffraction were $BaTi_4O_9$, $Ba_2Ti_9O_{20}$ and $Ba_3Ti_{12}Zn_7O_{34}$. The electrical characteristics of the sample are also shown in the Table. The material had an excellent value for $T_f$ of near zero.

EXAMPLE 7

The procedure of Example 1 was essentially repeated to produce a different ceramic composition in accordance with the present invention. The ceramic was formed from the composition listed in the Table and the major crystalline phases present as determined by X-ray diffraction were $BaTi_4O_9$, $Ba_2Ti_9O_{20}$ and $Ba_3Ti_{12}Zn_7O_{34}$. The electrical characteristics of the sample are also shown in the Table.

EXAMPLE 8

The procedure of Example 1 was essentially repeated to produce a different ceramic composition in accordance with the present invention which was formed from a size of sample according to Example 2. The ceramic had the composition listed in the Table and the major crystalline phases present as determined by X-ray diffraction were $BaTi_4O_9$, $Ba_2Ti_9O_{20}$ and $Ba_3Ti_{12}Zn_7O_{34}$. The electrical characteristics of the sample are also shown in the Table. The Q value for this material was quite high as was the dielectric constant.

EXAMPLE 9

The procedure of Example 1 was essentially repeated to produce a different ceramic composition in accordance with the present invention which had a size of sample according to Example 2. The ceramic was formed from the composition listed in the Table and the major crystalline phases present as determined by X-ray diffraction were $BaTi_4O_9$, $Ba_2Ti_9O_{20}$ and $Ba_3Ti_{12}Zn_7O_{34}$. The electrical characteristics of the sample are also shown in the Table. The sample had a relatively high Q value at the lower test frequency and an excellent value for $T_f$ as well as a high dielectric constant.

EXAMPLE 10

The procedure of Example 1 was essentially repeated to produce a different ceramic composition in accordance with the present invention. The ceramic had the composition listed in the Table and the major crystalline phases present as determined by X-ray diffraction were $BaTi_4O_9$, $Ba_2Ti_9O_{20}$ and $Ba_3Ti_{12}Zn_7O_{34}$. The electrical characteristics of the sample are also shown in the Table.

TABLE

| Example No. | Value of n | Oxide[1] (mol %) | ZnO (mol %) | $Nb_2O_5$ (mol %) | Electrical Characteristics | | | |
|---|---|---|---|---|---|---|---|---|
| | | | | | $Q^2$ | $Q^3$ | $T_f^4$ | $E^{'5}$ |
| 1 | 0 | 63.5 | 33.5 | 3.00 | 10,200 | | 0.5 | 36.6 |
| 2 | 0 | 62 | 35 | 3.00 | 10,500 | 35,000 | −0.5 | 36.6 |
| 3 | 0 | 61.81 | 34.72 | 3.47 | 10,600 | 35,000 | −0.1 | 35.5 |
| 4 | 0 | 69.05 | 28.13 | 2.82 | 11,000 | 33,000 | 3.2 | 36.6 |
| 5 | 0.1 | 61.34 | 35.14 | 3.52 | 10,300 | | −2.2 | 36 |
| 6 | 0.1 | 65.12 | 31.21 | 3.67 | 10,600 | 35,000 | 0 | 37 |
| 7 | 0.1 | 65 | 32.00 | 3.00 | 10,100 | | −0.4 | 36.9 |
| 8 | 0.1 | 75.44 | 20.47 | 4.09 | 11,700 | 32,500 | 5.5 | 37.3 |
| 9 | 0.2 | 68.11 | 28.03 | 3.86 | 10,700 | 34,000 | −0.6 | 37.4 |
| 10 | 0.2 | 80.45 | 15.17 | 4.38 | 10,400 | | 5 | 38.7 |

Notes to the Table:
[1] Oxide is of the formula $BaTi_{4+n}O_{9+2n}$
[2] Determined at 4 to 4.5 GHz
[3] Determined at 850-900 MHz
[4] Defined by $\Delta f / f \Delta T$ where f is frequency at 25° and T is room temperature to 60° C., $\Delta T = 35°$ C.
[5] Measured for samples having less than 2 percent porosity, that is, greater than 98 percent theoretical density.

It should be noted from the above that all of the compositions of the present invention have an excellent combination of electrical characteristics including the Q value at the frequencies of particular interest for dielectric resonators, the dielectric constant and the $T_f$ value. All of the compositions thus are well adapted for use in the applications as described previously, particularly for use as electrical components in equipment operating at microwave frequencies.

While there has been shown and described what are considered to be preferred embodiments of the present invention, it will be apparent to those skilled in the art to which the invention pertains that various changes and modifications may be made therein without departing from the invention as defined in the appended claims.

It is claimed:

1. A ceramic composition comprising oxides of the elements, Ba, Ti, Zn and Nb, said composition containing at least one of $BaTi_4O_9$ and $Ba_2Ti_9O_{20}$.

2. A composition in accordance with claim 1 comprising from about 90 to 50 mole percent oxides of barium and titanium, about 1 to 50 mole percent oxides of zinc and about 0.1 to 10 mole percent oxides of niobium, the mole ratio of titanium to barium being from 3.8 to 4.5.

3. The composition in accordance with claim 2 further including about 0.001 to 0.1 mol percent manganese.

4. The composition in accordance with claim 3 wherein the mol ratio of titanium to barium is from 4 to 4.3.

5. The composition in accordance with claim 2 wherein the mol ratio of titanium to barium is from 4 to 4.3.

6. The composition in accordance with claim 5 wherein the mol percent of oxides of niobium is 2 to 7.

7. A composition in accordance with claim 1 wherein from about 90 to 50 mole percent of the contained elements are barium and titanium, about 1 to 50 mole percent of the contained elements is zinc and about 0.1 to 10 mole percent of the contained elements is niobium the, mol ratio of titanium to barium being from 4 to 4.5.

8. The composition in accordance with claim 7 further including about 0.001 to 0.1 mol percent manganese.

9. The composition in accordance with claim 8 wherein the mol ratio of titanium to barium is from 4 to 4.3.

10. The composition in accordance with claim 7 wherein the mol ratio of titanium to barium is from 4 to 4.3.

11. The composition in accordance with claim 5 wherein the mol percent of element niobium is 2 to 7.

12. A ceramic composition comprising oxides of the elements Ba, Ti, Zn, and Me, where Me is Nb or Nb and Ta, the mole ratios of the elements relative to Ba being:

$$3.8 \leq Ti \leq 4.5$$

$$0.1 \leq Zn \leq 1.0$$

$$0.05 \leq Me \leq 0.3$$

and the composition contains at least one crystal structure of $BaTi_4O_9$ and $BaTi_9O_{20}$.

13. A ceramic composition in accordance with claim 12 wherein the mole ratio of Ti is from 4 to 4.3.

14. A ceramic composition in accordance with claim 13 wherein the mole ratio of Zn is from 0.4 to 0.8.

15. A composition comprising oxides of Ba, Ti, Zn and Nb, said composition having a Q value of at least 25,000 at a frequency of about 900 MHz.

16. A composition comprising oxides of Ba, Ti, Zn and Nb, the mole ratio of titanium to barium in said composition being in the range of from 3.8 to 4.5.

* * * * *